United States Patent
Ishibashi et al.

(10) Patent No.: US 6,944,538 B2
(45) Date of Patent: Sep. 13, 2005

(54) NAVIGATION APPARATUS, NAVIGATION SYSTEM AND NAVIGATION METHOD PROVIDING GUIDANCE FOR LANE CHANGES

(75) Inventors: Noboru Ishibashi, Okazaki (JP); Takanori Kaji, Okazaki (JP); Kenta Oonishi, Okazaki (JP)

(73) Assignee: Aisin AW Co., Ltd., (JP)

( * ) Notice: Subject to any disclaimer, the term of this patent is extended or adjusted under 35 U.S.C. 154(b) by 0 days.

(21) Appl. No.: 10/995,515

(22) Filed: Nov. 24, 2004

(65) Prior Publication Data
US 2005/0143911 A1    Jun. 30, 2005

(30) Foreign Application Priority Data
Dec. 24, 2003   (JP)   ............................. 2003-428448

(51) Int. Cl.⁷ .......................................... G06F 165/00
(52) U.S. Cl. ..................................... 701/209; 701/211
(58) Field of Search ...................... 701/200–213; 342/357.01–357.17; 340/988–995.28

(56) References Cited

U.S. PATENT DOCUMENTS

| | | | | |
|---|---|---|---|---|
| 5,764,139 A | * | 6/1998 | Nojima et al. | 340/461 |
| 6,385,536 B2 | * | 5/2002 | Kimura | 701/209 |
| 6,411,898 B2 | * | 6/2002 | Ishida et al. | 701/211 |
| 6,690,268 B2 | * | 2/2004 | Schofield et al. | 340/438 |

FOREIGN PATENT DOCUMENTS

| | | |
|---|---|---|
| JP | 62-093617 | 4/1987 |
| JP | 10-281795 | 10/1998 |

* cited by examiner

Primary Examiner—Richard M. Camby
(74) Attorney, Agent, or Firm—Lorusso & Loud (57) ABSTRACT

A navigation system includes an input device for inputting a destination, a current location detector for detecting current location of the vehicle, a camera for imaging an area to the rear of the vehicle, a route search program for searching for a route to the destination and a controller for providing guidance along the route determined by the route search. The controller controls the imaging by the camera according to route guidance information and determines whether a lane change is required in accordance with information obtained from the image. When it is determined that a lane change is required, the traffic situation in the vicinity surrounding the vehicle is recognized and guidance for the lane change is provided.

6 Claims, 9 Drawing Sheets

FIG.1

| ROAD NUMBER 1 | | | | |
|---|---|---|---|---|
| THE NUMBER OF ENTRY LANES = 3 | | | | |
| THE NUMBER OF TURN LANES AMONG ENTRY LANES = 1 | | | | |
| ENTRY ROAD NUMBER | EXIT ROAD NUMBER | RUNNING LANE | | |
| 1 | 2 | APPROVED | NOT APPROVED | NOT APPROVED |
| 1 | 3 | APPROVED | APPROVED | NOT APPROVED |
| 1 | 4 | NOT APPROVED | NOT APPROVED | APPROVED |
| ROAD NUMBER 2 | | | | |
| THE NUMBER OF ENTRY LANES = 2 | | | | |
| THE NUMBER OF TURN LANES AMONG ENTRY LANES = 0 | | | | |
| ENTRY ROAD NUMBER | EXIT ROAD NUMBER | RUNNING LANE | | |
| 2 | 5 | APPROVED | APPROVED | |
| 2 | 6 | NOT APPROVED | APPROVED | |
| 2 | 7 | APPROVED | NOT APPROVED | |
| ROAD NUMBER 3 | | | | |
| THE NUMBER OF ENTRY LANES = 3 | | | | |
| THE NUMBER OF TURN LANES AMONG ENTRY LANES = 0 | | | | |
| ENTRY ROAD NUMBER | EXIT ROAD NUMBER | RUNNING LANE | | |
|  |  |  | | |
|  |  |  | | |
|  |  |  | | |

NAVIGATION APPARATUS, NAVIGATION SYSTEM AND NAVIGATION METHOD PROVIDING GUIDANCE FOR LANE CHANGES

CROSS-REFERENCE TO RELATED APPLICATION

The present application claims priority under 35 USC 119, of Japanese Patent Application No. 2003-428448 filed on Dec. 24, 2003, the teachings of which, including the specification, drawings and abstract, are incorporated herein by reference in their entirety.

BACKGROUND OF THE INVENTION

1. Field of the Invention

The present invention relates to a navigation apparatus providing guidance for traffic lane changes.

2. Description of the Related Art

In conventional vehicle navigation apparatuses, a route to a destination is determined by search and guidance is provided to assist travel along the determined route. At an intersection or a branch point, guidance, such as turning right or turning left, is provided for following the determined route. A system which announces a right turn lane and/or a left turn lane is disclosed, for example, in Japanese Unexamined Patent Application Publication No. 62-093617. Other related art photographs the road surface ahead of the vehicle using a camera and an image, such as an arrow painted on the road surface which shows branching, is processed to recognize the traffic lane in which the vehicle is traveling, and recommends a lane chance if appropriate, as disclosed, for example, in Japanese Unexamined Patent Application Publication No. ("Kokai") 10-281795.

However, with conventional vehicle navigation systems, drivers had to judge the current traffic situation since traffic lanes were not recognized at an intersection and/or branch point where the vehicle is to change lanes. With the apparatus disclosed in Kokai 10-281,795, to prompt traffic lane changes, the camera photographs the road surface in front of the vehicle, and traffic lanes are recognized. However, as the vehicle changes lanes, the system does not recognise whether or not another vehicle is approaching from behind, thus leaving the driver with the burden of determining the timing for a traffic lane change.

SUMMARY OF THE INVENTION

In view of the above problem, an object of the present invention is to provide a navigation system which eases the burden of changing lanes, taking into consideration the traffic situation surrounding the vehicle.

To achieve the above object, the present invention provides a navigation apparatus mounted in a vehicle comprising imaging means for imaging an area to the rear of the vehicle, input means for inputting a destination, current location detection means for detecting the current location, route search means for searching for a route up to the destination input by the input means, and control means for providing guidance for the route determined by the route search means. The control means controls the imaging by the imaging means in accordance with route guidance information, and determines whether lane changes are required according to information obtained from the imaging. Further, when it is determined that a lane change is required, road information for the vicinity of the vehicle is recognized and guidance for the lane change is provided.

In the present invention, guidance for changing to the proper lane is provided by recognising the traffic situation in the vicinity of the vehicle. Accordingly, the navigation apparatus aids a driver in changing lanes by advising the driver of the proper timing for changing to the proper lane.

The present invention also provides a method for guidance in changing lanes. The method includes imaging, by use of a camera, an area to the rear of the vehicle to obtain an image. The method further includes inputting a destination, detecting current location of the vehicle and searching for an optimum route to the destination. The imaging by the camera is controlled in accordance with route guidance information for the optimum route as determined by the search. The method further includes determining whether or not a traffic change is required in accordance with information obtained from the image and, when it is determined that a lane change is required, recognizing a traffic situation in a vicinity surrounding the vehicle and providing guidance for a lane change.

In a preferred embodiment the method also includes determining, from the image, whether or not another vehicle is currently traveling in the lane into which the vehicle has been directed by the guidance for a lane change and, if another vehicle is so present, adding warning information to the guidance information.

Determining whether or not a traffic lane change is required may include a determination of the lane in which the vehicle is currently traveling by comparing information obtained from the image with the route guidance information, i.e., matching information from the image with a lane identified by stored data. A traffic lane change may be indicated in a case where it is determined that the vehicle is currently traveling in a lane which is not a lane designated for the optimum route.

DESCRIPTION OF THE PREFERRED EMBODIMENTS

Preferred embodiments of the present will now be described in detail with reference to the drawings.

Figure 1:
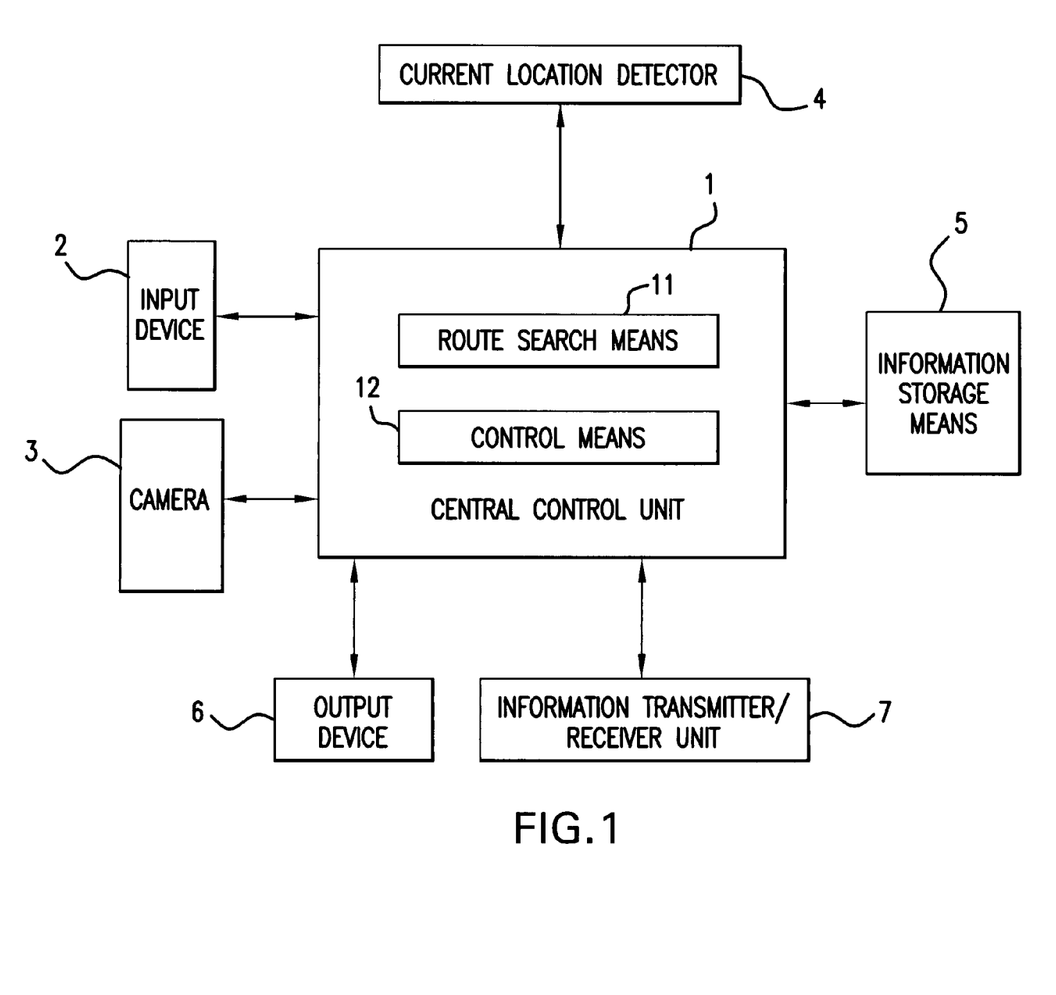
FIG. 1 is a block diagram of a navigation apparatus according to a first embodiment of the present invention.

FIG. 1 shows the first embodiment of the present invention as including: an input device 2 for inputting information relevant to route guidance, such as a place of departure and a destination; a camera 3 for photographing to the rear of the vehicle and for recognizing the traffic situation in the near vicinity immediately surrounding the vehicle and the traffic lane in which the vehicle is running; a current location detector 4 for obtaining information relevant to the current location of the vehicle; an information storage device 5 in which are stored data such as map data, navigation data necessary for searching for a route and display/voice guidance data necessary for providing guidance along the route, and programs (application and/or OS) for displaying a map, searching for a route and providing guidance such as voice guidance. The navigation apparatus further includes a central processing unit 1 comprising route searching means 11 for searching for a route to the destination input by the input device 2 and control means 12 for setting a detection range of an obstacle sensor according to route guidance information. The control means 12 serves as a navigator-processing means for generating a map display and display/voice guidance for providing the necessary route guidance, controlling the overall system. Output device 6 includes a display and a speaker for outputting information as voice route guidance. Information transmitter/receiver unit 7 transmits and receives information such as road information and traffic information which relate to the travel of the vehicle, detects parameters relevant to the current location of the vehicle and transmits and receives information relevant to the current location.

In the first embodiment, the camera 3 is installed in the rear of the vehicle for showing the driver a view to the rear of the vehicle, which view is useful to the driver, for example, when the driver parks his/her vehicle in a garage. The traffic lane in which the vehicle is running may be recognized utilizing information from the image of the road surface obtained with the camera. Further, that image shows the traffic situation, including approach of other vehicles from behind the vehicle. In the first embodiment, the camera is controlled by the control means 12 so that a view (image) to the rear of the vehicle is obtained when the vehicle crosses a lane guidance line set for the route.

Figure 2:
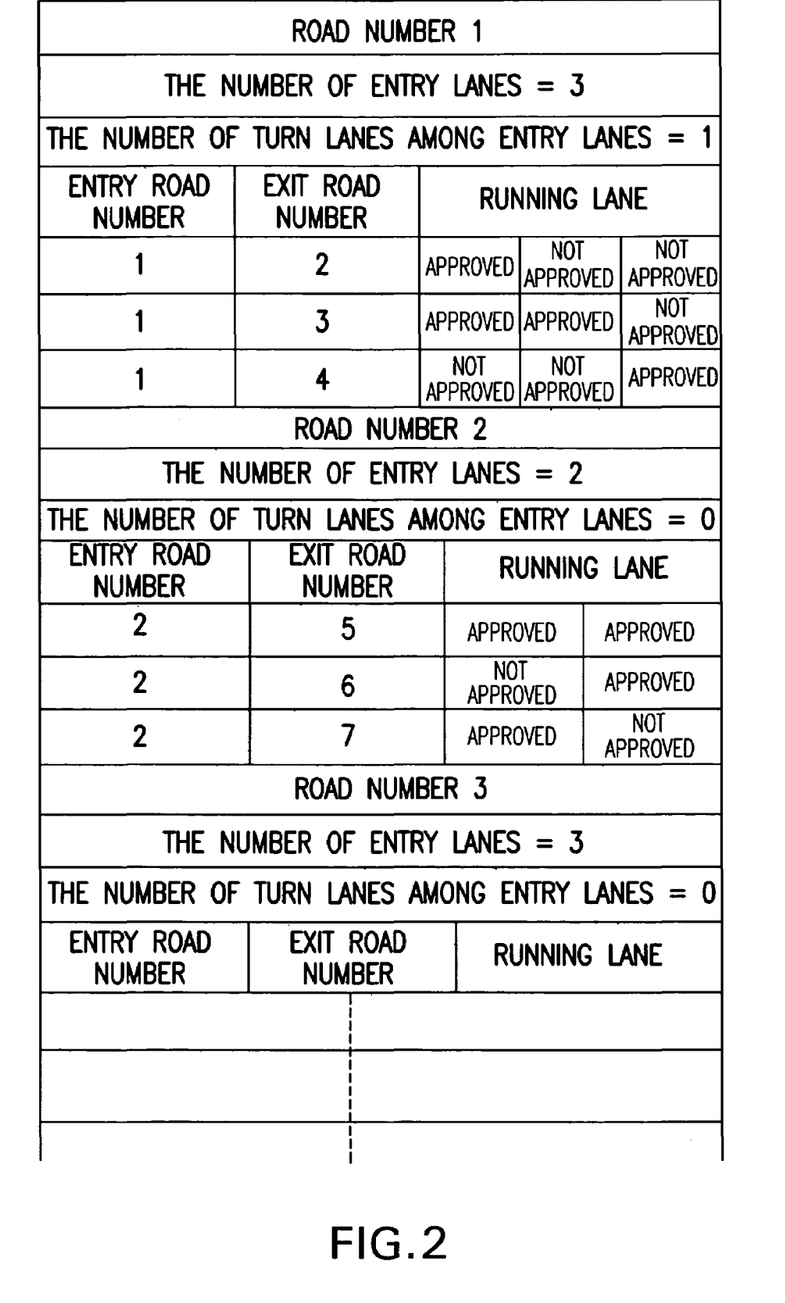
FIG. 2 is a diagram showing data structure of traffic lane information.

FIG. 2 shows an example of data structure of traffic lane information included in road attribute data stored in an information storage device 5. For example, with the road shape shown by way of example in FIG. 3, roads, approach routes and return routes respectively are numbered from 1 to 7. Road 1 is shown as having three entry lanes. The arrows in the leftmost lane indicate "left turn or go straight", that in the middle lane indicates "go straight" and that in the rightmost lane indicates "right turn only". When a vehicle turns left from the road 1 and enters road 2 (from entry road 1 to exit road 2), the guidance running lane for road 1 is the leftmost lane.

Data structure of traffic lane information for such a road shape, as shown in FIG. 2, consists of a road number, the number of entry lanes, the number of turn lanes included among the entry lanes and the entry road number and the exit road number correlated with running-lane information. The turn lanes included among the entry lanes may be dedicated exclusively to left turn and right turn. Travel lane information is stored for an entry lane in order to provide guidance for connecting to the proper exit road.

For example, when the vehicle turns left from road number 1 to a road number 2, only the leftmost lane of road number 1 is available for turning left. The middle lane and the rightmost lane are not available for turning left. Accordingly, the running-lane information is stored as "approved" for the left lane, "not approved" for the middle lane and "not approved" for the rightmost lane. Similarly, when the vehicle goes straight from road number 1 to road number 3, the leftmost lane and the middle lane are available for going straight. The rightmost lane is not available for going straight because it is a right-turn-only lane. Accordingly, running-lane information is stored as "approved" for the leftmost lane, "approved" for the middle lane and "not approved" for the rightmost lane.

By using such a data structure for traffic lane information, for example, when the proscribed route has the vehicle turning left from the road 1 and onto road 2, only the left-turn arrow of the leftmost lane may be displayed for guidance.

Figure 3:
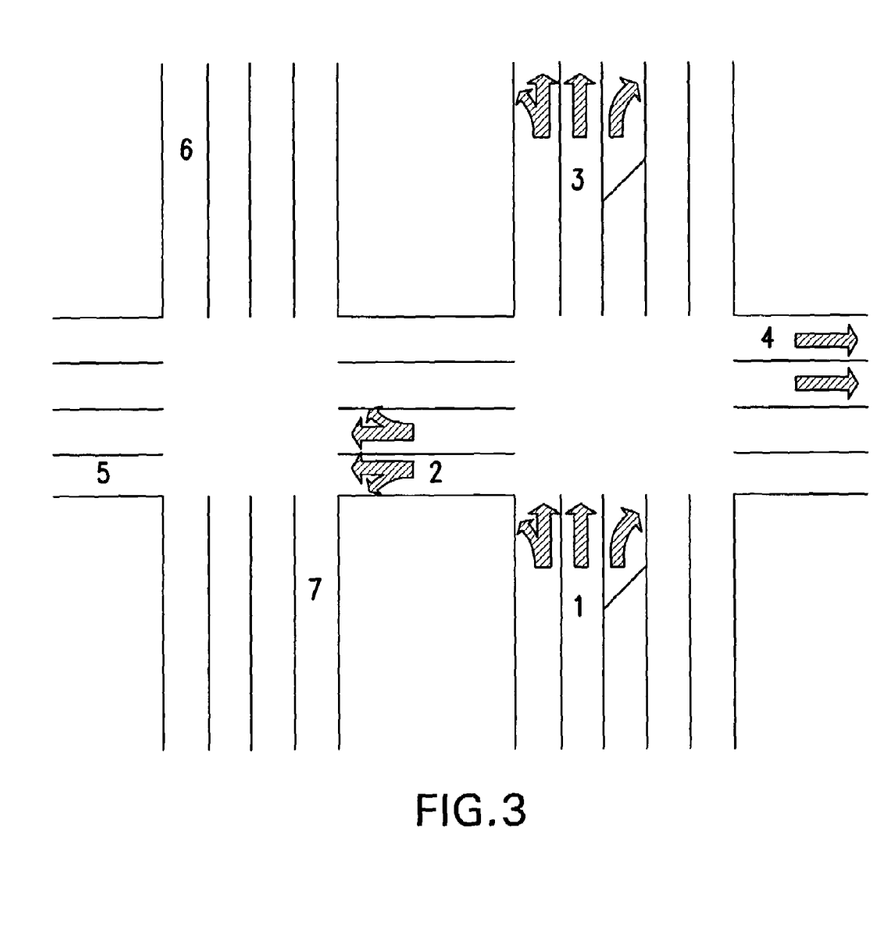
FIG. 3 is a diagram further illustrating data structure of traffic lane information.

The guidance routine, making use of the camera, for turning at a branch point will now be described. In the description below, a "target lane" is a traffic lane into which the vehicle moves in order to stay on the "searched route". In the first embodiment, information for the traffic lane in which the vehicle is currently traveling is obtained by the camera 3 by imaging the area to the rear of the vehicle. The obtained traffic lane information and traffic lane information data shown in FIG. 2 and FIG. 3 are compared to determine whether or not the vehicle is currently traveling in the optimal traffic lane for the route. If not, at an optional position on the route, guidance is provided so that the vehicle can change from the traffic lane in which it is currently traveling to the optimal traffic lane. A routine for providing guidance for the traffic lane change is described below.

Figure 4:
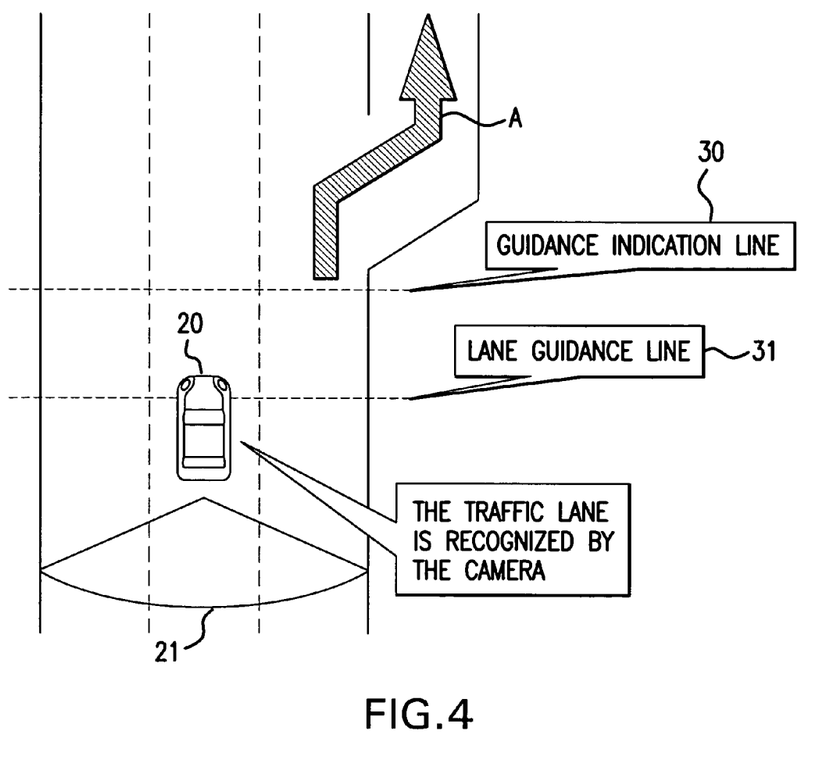
FIG. 4 is a diagram illustrating guidance for a case where branching of a lane is encountered by the vehicle.

FIG. 4 illustrates an example wherein the route travelled by the vehicle has three traffic lanes in one direction. In this example, as shown by arrow A, when the vehicle changes lanes, into the lane for right turn only, the vehicle moves to the right. In the navigation apparatus, a guidance-indication line 30 is set as route guidance information (in memory) for each intersection and/or branching point on the guided route. When the vehicle 20 passes the guidance-indication line 30, a voice message "Three-hundred meters ahead, please move one lane to the right", for example, is announced. In the first embodiment, a lane guidance line 31 is set as route guidance information in advance of the guidance-indication line 30. When the current-location detector 4 detects that the vehicle 20 has passed over the lane guidance line 31, control of the camera 3 by the control means 12 is initiated. Further, in order to recognise the traffic lane in which the vehicle is traveling and the traffic situation, a rear view area 21 including adjacent traffic lanes is imaged.

Based on an image of the area of the lane guidance line 31 shown in FIG. 4, it can be determined that the vehicle 20 is traveling the middle lane which is not the proper lane for guidance. Next, since a lane change is required, it is determined whether or not there are other vehicles in the traffic lane which the vehicle must enter in proceeding ahead. In this example, as represented by the arrow shown in FIG. 5, a directional guidance image 22 directing a lane change to the right is displayed on a screen of the navigation apparatus, since the vehicle must move into a turn lane for a right turn only.

Figure 6:
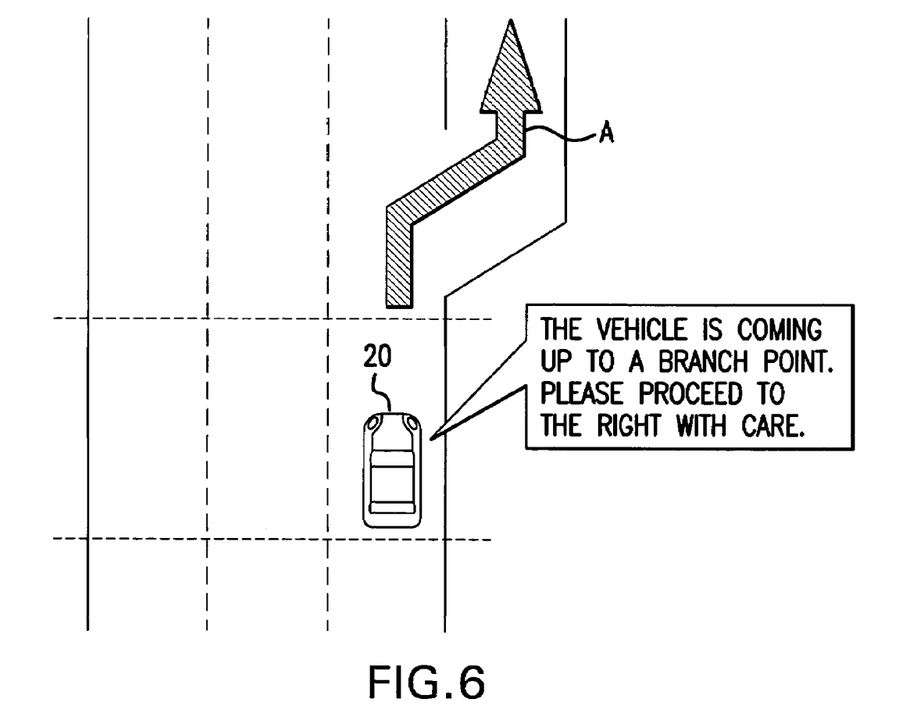
FIG. 6 is a diagram illustrating guidance when the vehicle is traveling in a traffic lane other than a traffic lane in accordance with the route determined by search.

FIG. 6 is a diagram illustrating guidance generated when the vehicle is traveling in a lane other than that intended by the guidance.

Figure 5:
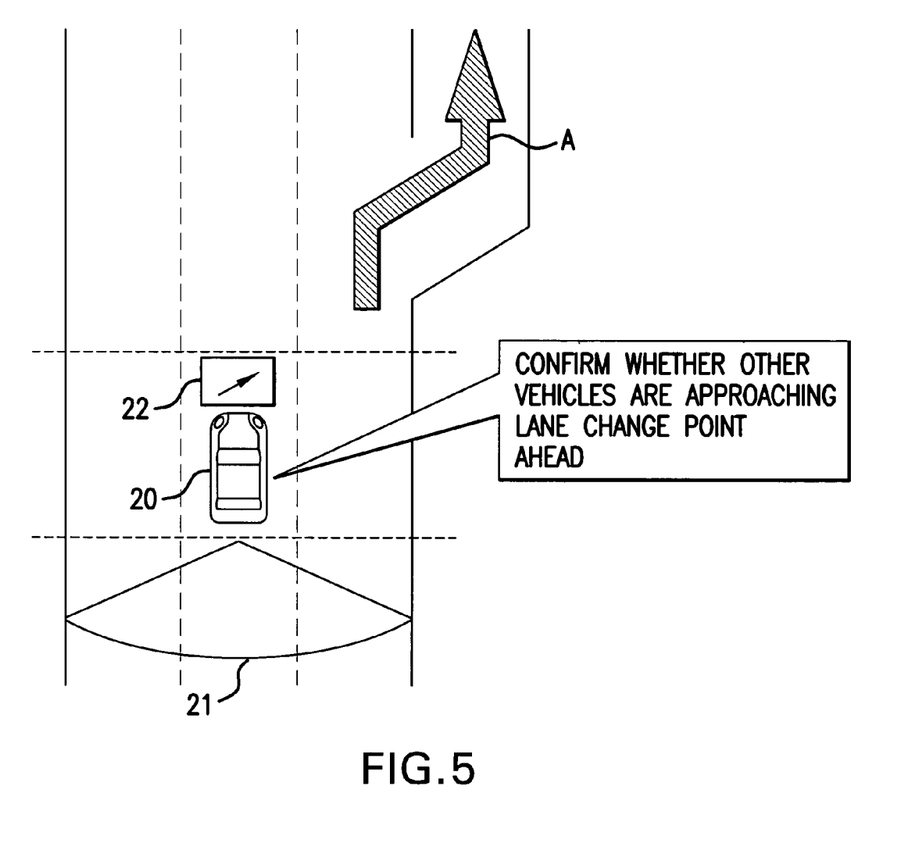
FIG. 5 is a diagram illustrating guidance for a lane change.
Figure 7:
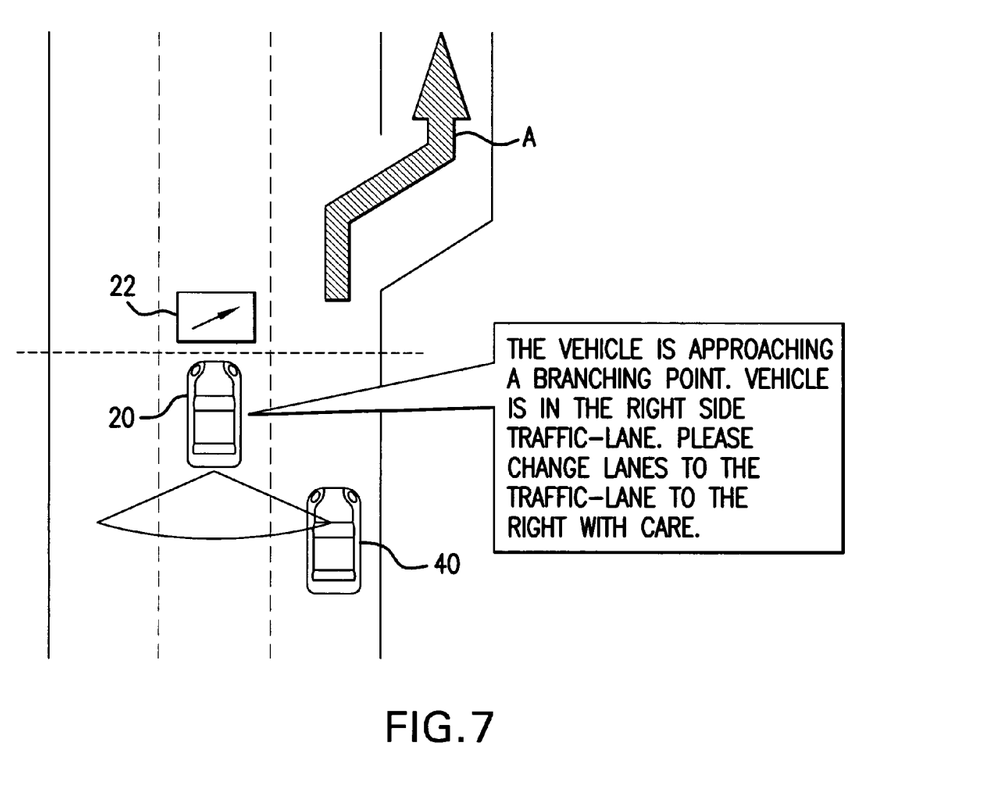
FIG. 7 is a diagram illustrating guidance when another vehicle is traveling toward the area of a lane which is the objective of the intended lane change.

From the image of the area of the lane guidance line 31 shown in FIG. 4, it can be determined that the vehicle 20 is traveling in the traffic lane to the right of the lane for which guidance is provided. Since the vehicle need not change lanes, guidance for branching, for example, a voice message "the vehicle is approaching a branching point, please proceed to the right with care." is announced. A "branching point" is point where a lane, e.g. a turn lane, branches off another lane, e.g., the lane in which the vehicle is currently traveling, As shown in FIG. 5, in order to change lanes, it is confirmed whether or not other vehicles are in the lane into which the vehicle is to move ahead in following the guidance route. FIG. 7 shows the case where another vehicle 40 is located in the traffic lane to the right side in the rearward image obtained by the camera. Since another vehicle 40 is located in the traffic lane ahead into which the vehicle is to move, a warning is issued as one item of guidance, for example, a voice message "the vehicle is coming up to the branching point. Another vehicle is traveling in the traffic lane to your right. Please proceed into the traffic lane to your right side with care." is announced.

Figure 8:
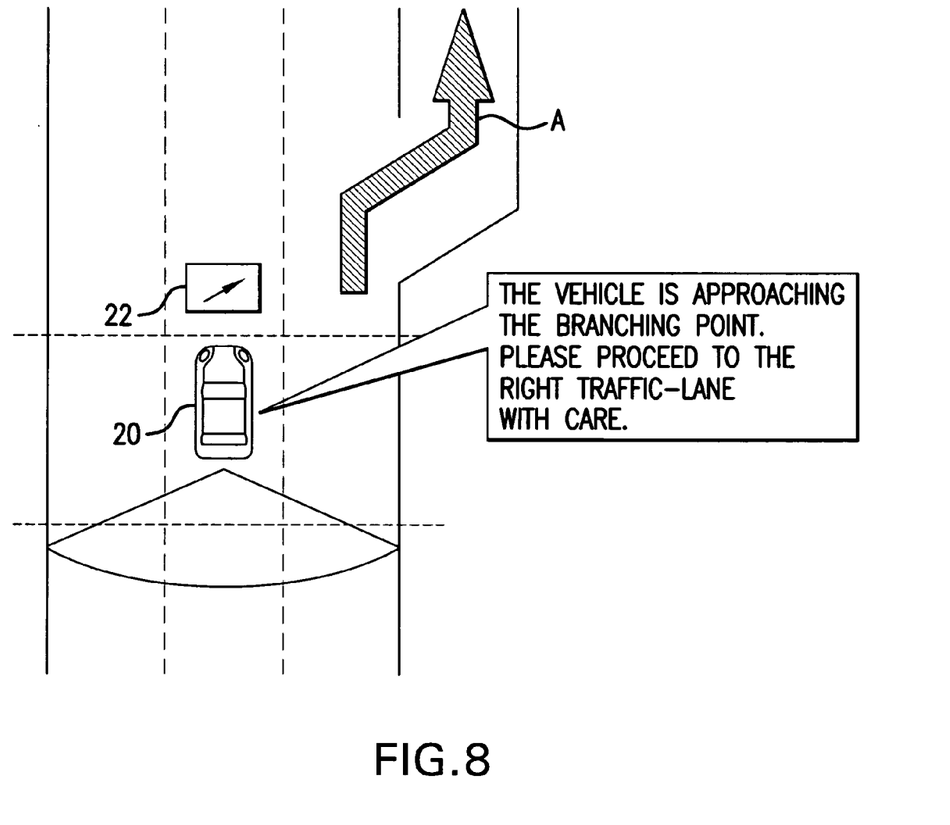
FIG. 8 is a diagram illustrating guidance when there is no other vehicle soon to enter the area which the vehicle will enter upon making the lane change.

As shown in FIG. 5, in order to change lanes, it is confirmed whether or not other vehicles are in the lane into which the vehicle is to move ahead in following the guidance route. FIG. 8 shows the case where no vehicle is shown in the image of the traffic lane to the right side. Since no other vehicle is located in that lane to the right where the vehicle is to change in accordance with direction guidance "the vehicle is coming to the branching point. Please proceed into the traffic lane to the right with care", for example, is announced.

Figure 9:
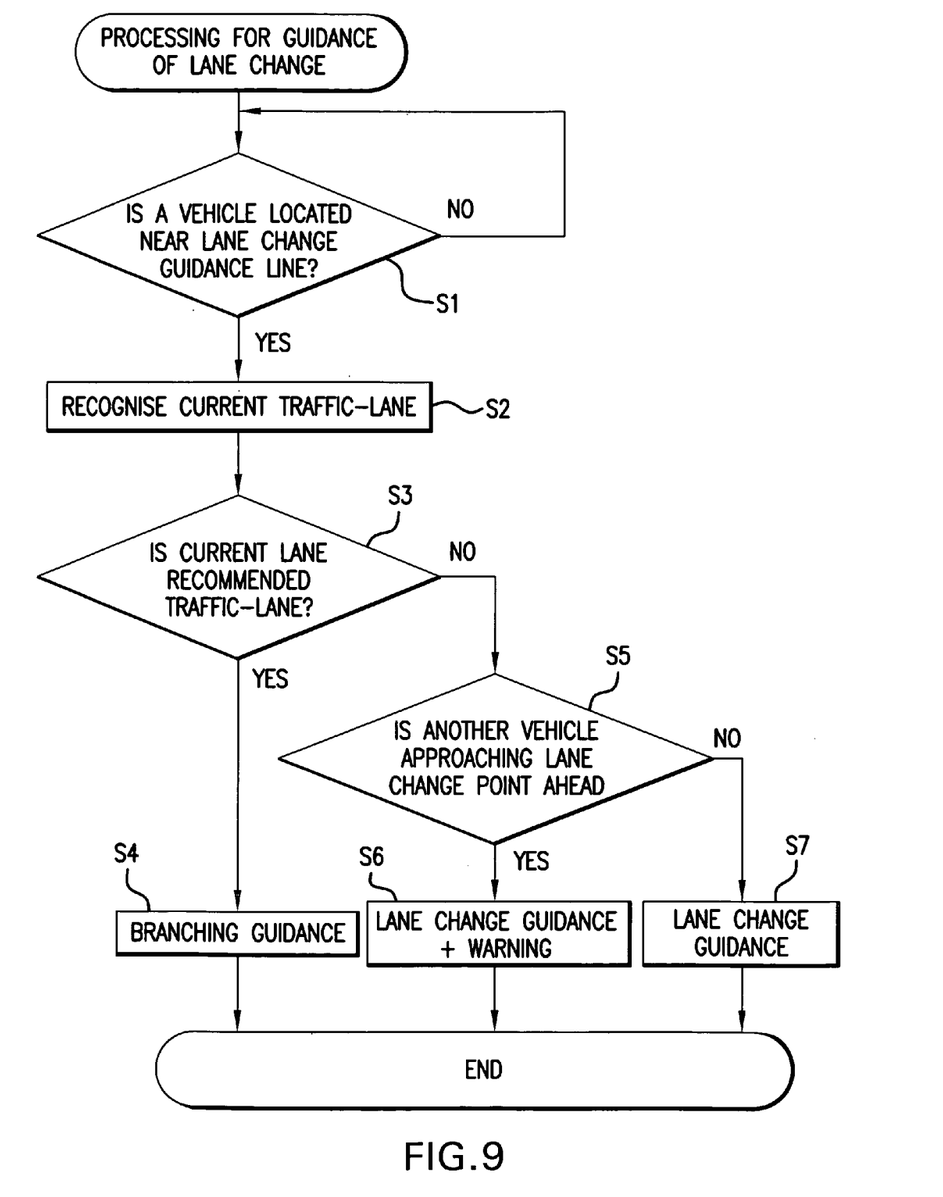
FIG. 9 is a flow chart of a routine for providing guidance at a lane branch point.

In the guidance routine executed when the vehicle is to switch lanes at a branching point ahead, as illustrated in FIG. 9, first it is judged whether the vehicle is located near a traffic lane change guidance line set on the route (step S1). When the vehicle passes the traffic lane change guidance line, the traffic lane in which the vehicle is traveling is recognized in the image from the camera (step S2). After recognition of the travel lane, it is then judged whether or not the travel lane is the recommended traffic lane in view of route information and traffic lane information data (step S3). When the travel lane, i.e., the lane in which the vehicle is traveling, is the recommended traffic lane, i.e., in accordance with the guidance route, lane change is not required. Accordingly, the routine proceeds directly to guidance for a lane branching point (step S4). On the other hand when at step S3, the vehicle is not traveling in the recommended traffic lane, a lane change is required and it is determined whether or not other vehicles are located where the vehicle is to change lanes ahead (step S5). When other vehicles are located in the vicinity of the vehicle and in the lane into which the vehicle is to move in a lane change ahead, a warning is issued announcing that other vehicles are located in the lane where the vehicle is to proceed by a lane change ahead (step S6). When other vehicles are not located where the vehicle is to proceed by changing lanes ahead, only traffic lane change guidance is provided (stepS7).

The present invention offers the advantage of facilitating changing traffic lanes and facilitating the switching of a route in consideration of the traffic situation in the vicinity surrounding the vehicle.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A navigation apparatus for mounting in a vehicle equipped with a camera for imaging to obtain an image of an area to the rear of the vehicle, said navigation apparatus comprising:

input means for inputting a destination;

current location detection means for detecting current location of the vehicle;

route search means for searching to determine a route to the destination input by the input means;

control means for providing guidance to assist a driver to follow the determined route, for controlling the imaging by the camera according to route guidance information for the determined route, for determining whether or not a traffic lane change is required in accordance with information obtained from the image, and when it is determined that a lane change is required, for recognizing traffic in a vicinity surrounding the vehicle and providing guidance for a lane change.

2. A navigation apparatus according to claim 1, wherein said control means adds warning information to the guidance information when it is determined from the image that another vehicle is currently traveling in the lane into which the vehicle would move by the lane change.

3. A navigation system for providing guidance to assist a driver of a vehicle, said navigation system comprising:

a camera for imaging to obtain an image of an area to the rear of the vehicle;

input means for inputting a destination;

current location detection means for detecting current location of the vehicle;

route search means for searching to determine a route to the destination input by the input means;

control means for providing guidance to assist a driver to follow the determined route, for controlling the imaging by the camera according to route guidance information for the determined route, for determining whether or not a traffic lane change is required in accordance with information obtained from the image, and when it is determined that a lane change is required, for recognizing traffic in a vicinity surrounding the vehicle and providing guidance for a lane change.

4. A navigation apparatus according to claim 3, wherein said control means adds warning information to the guidance information when it is determined from the image that another vehicle is currently traveling in the lane into which the vehicle would move by the lane change.

5. A navigation method including provision of guidance for lane changes, said method comprising:

imaging an area to the rear of the vehicle to obtain an image;

inputting a destination;

detecting current location of the vehicle;

searching a database including route guidance information to determine a route to the destination;

controlling the imaging by the camera in accordance with route guidance information for the determined route;

determining whether or not a traffic lane change is required in accordance with information obtained from the image;

when it is determined that a lane change is required, recognizing a traffic situation in a vicinity surrounding the vehicle and providing guidance for a lane change.

6. The method of claim 5 additionally comprising:
determining from the image whether or not another vehicle is traveling in the traffic lane into which the vehicle is directed by the guidance for lane change; and where it is determined that another vehicle is traveling in the lane into which the vehicle is directed by the guidance for a lane change, adding warning information to the guidance information.

* * * * *